United States Patent
Ruellan

(10) Patent No.: US 7,552,435 B2
(45) Date of Patent: Jun. 23, 2009

(54) SORTING AND EXECUTING A SET OF FUNCTIONS BY A SERVER STATION IN A COMMUNICATION NETWORK

(75) Inventor: Herve Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 10/266,682

(22) Filed: Oct. 9, 2002

(65) Prior Publication Data

US 2003/0120703 A1    Jun. 26, 2003

(30) Foreign Application Priority Data

Oct. 9, 2001    (FR) ................... 01 12965

(51) Int. Cl.
G06F 9/46       (2006.01)
G06F 15/16      (2006.01)
G06F 7/00       (2006.01)

(52) U.S. Cl. ............ 718/102; 718/100; 718/103; 709/201; 707/100

(58) Field of Classification Search ......... 718/102–103; 705/1–500; 707/2–5, 100, 102; 709/201, 709/217, 219; 717/9
See application file for complete search history.

(56) References Cited

U.S. PATENT DOCUMENTS

| | | | | |
|---|---|---|---|---|
| 4,499,555 A | * | 2/1985 | Huang ............... | 707/7 |
| 5,448,731 A | * | 9/1995 | Wang et al. ......... | 718/103 |
| 5,542,046 A | | 7/1996 | Carlson et al. ...... | 395/186 |
| 5,583,778 A | * | 12/1996 | Wind ................ | 705/34 |
| 5,649,186 A | * | 7/1997 | Ferguson ........... | 707/10 |
| 6,044,408 A | * | 3/2000 | Engstrom et al. ..... | 719/328 |
| 6,049,783 A | * | 4/2000 | Segal et al. ......... | 705/37 |
| 6,144,986 A | * | 11/2000 | Silver ............... | 709/201 |
| 6,249,783 B1 | * | 6/2001 | Crone et al. ........ | 707/2 |
| 6,271,927 B1 | * | 8/2001 | Kohtani et al. ...... | 358/1.16 |
| 6,549,907 B1 | * | 4/2003 | Fayyad et al. ....... | 707/101 |
| 6,556,988 B2 | * | 4/2003 | Tsuchida et al. ..... | 707/3 |
| 7,240,024 B2 | * | 7/2007 | Moreau .............. | 705/26 |
| 2002/0069130 A1 | | 6/2002 | Moreau .............. | 705/26 |
| 2003/0041130 A1 | * | 2/2003 | Harrisville-Wolff et al. | 709/221 |
| 2004/0068538 A1 | * | 4/2004 | Lunenfeld .......... | 709/203 |

FOREIGN PATENT DOCUMENTS

EP    1 065 592    1/2001

OTHER PUBLICATIONS

Derwent Abstract of Wang et al., US 5,448,731, 1995.*
"PayWord and MicroMint: Two simple micropayment schemes", Ronald L. Rivest and Adi Shamir, May 7, 1996, MIT Laboratory for Computer Science, availabe at http://theory.lcs.mit/edu/~rivest/RivestShamir-mpay.ps.

* cited by examiner

*Primary Examiner*—Van H Nguyen
*Assistant Examiner*—Kenneth Tang
(74) *Attorney, Agent, or Firm*—Fitzpatrick, Cella, Harper & Scinto

(57) ABSTRACT

Execution of a function execution request is performed by a server, where the receives the function execution request, which includes a set of functions and a sorting criterion. The server identifies, from the received function execution request, the set of functions included in the request, and reads the sorting criterion included in the received request. The server then sorts the identified set of functions included in the function execution request using the read sorting criterion, and executes the identified set of functions sorted in the sorting step based on a sorted order.

16 Claims, 4 Drawing Sheets

SORTING AND EXECUTING A SET OF FUNCTIONS BY A SERVER STATION IN A COMMUNICATION NETWORK

The present invention concerns a method of sequencing a set of functions included in a function execution request.

It also concerns a method of executing functions on a server station in a communication network.

In general terms, the present invention concerns the remote execution of functions in a communication network.

When a client station uses services supplied by a server station in a communication network, this operation is performed by means of the sending, by the client station, of one or more function execution requests.

In order to limit the transfers of requests on the communication network, it is advantageous to group together, in the same execution request, several functions to be executed.

Moreover, when these functions are paid for, that is to say when each function is associated with an execution cost, it is practical to include a single payment in the request liable to cover the global cost of execution of the functions included in this request.

At the present time, when such an execution request is sent to a conventional server station, the latter refuses to process all the functions requested when the payment supplied by the client is less than the total cost of the functions which are to be executed.

In such a case, the conventional server station returns an error message to the client station so that the execution request is not processed.

The purpose of the present invention is to optimize the processing of an execution request by a server station when several functions to be executed are included in this request.

To this end, the present invention relates, according to a first aspect, to a method of sequencing a set of functions included in a function execution request.

According to the invention, this sequencing method comprises the following steps:
  identifying said set of functions included in the execution request;
  reading a sorting criterion from the function execution request; and
  sorting the functions using the given criterion.

By virtue of the prior sorting of the functions in the execution request, it is thus possible to optimize the execution of this request by processing, as a priority, functions chosen.

By virtue of the determination of a chosen criterion amongst the set of criteria dependent on the execution cost, it is possible to adapt the sorting of the functions included in the execution request to the requirements of the client or of the server station.

According to one practical embodiment of the invention, at the step of reading a criterion, the criterion belongs to a set of criteria comprising at least a sorting by increasing execution cost and a sorting by decreasing execution cost.

According to the result which it is wished to obtain during the execution of the request, it is possible to choose one or other of these criteria.

In particular, a sorting by increasing execution cost makes it possible, when the request is executed in the order of the sequenced functions, to execute the maximum number of functions for a given price.

On the other hand, a sorting of the functions by decreasing execution cost makes it possible to execute, as a priority, the functions associated with the highest execution cost, that is to say in principle functions which have a high added value and are liable to interest the client station as a priority.

According to another embodiment of the invention, at the step of reading a criterion, the sorting criterion is an order of priority associated with each function.

Thus the sorting criterion directly recorded in the execution request sent by the client station can indicate to the server the order in which it is wished to have the functions included in the request executed.

According to a second aspect, the present invention relates to a method of executing functions on a server station in a communication network, the executable functions being included in a unique function request.

This execution method comprises, when only a part of said functions can be executed by the server station, the following steps:
  sequencing said functions in an order chosen in accordance with the sequencing method described above; and
  executing the functions in the order chosen as long as the server can execute said functions.

This method of executing functions thus makes it possible to optimize the processing of a function execution request, particularly when the sum of the function execution costs is greater than a predetermined amount.

In practical terms, the execution step includes the following substeps, implemented for each function:
  obtaining an execution cost associated with the current function;
  comparing a predetermined amount and the cumulated sum of the execution cost obtained and the sum of the execution costs associated with said functions previously executed; and
  executing the current function if and only if the cumulated sum is less than or equal to said predetermined amount.

Correlatively, the present invention also concerns a device for sequencing a set of functions included in a function execution request, Comprising:
  means of identifying the set of functions included in the execution request;
  means of reading a sorting criterion from the function execution request; and
  means of sorting the functions using the given criterion.

The present invention also relates to a device for executing functions on a server station in a communication network, the executable functions being included in a unique function request, comprising a sequencing device as described previously and means of executing functions in the chosen order as long as the server can execute said functions.

These sequencing and execution devices have characteristics and advantages similar to those described previously in relation to the sequencing and execution methods.

The present invention also relates to a computer, a server station in a communication network and a communication network adapted to implement the sequencing and/or execution methods according to the invention.

The invention also concerns a client station in a communication network adapted to implement the sequencing method according to the invention.

The invention also concerns information storage means, possibly totally or partially removable, which can be read by a computer system, comprising instructions of a computer program adapted to implement the sequencing and/or execution methods according to the invention, when this program is loaded and executed by the computer system.

Finally, the invention concerns a computer program which can be read by a microprocessor, comprising portions of software code adapted to implement the sequencing and/or execution methods according to the invention when said computer program is loaded and executed on a computer.

Other particularities and advantages of the invention will also emerge from the following description.

In the accompanying drawings, given by way of non-limitative examples:

Figure 1:
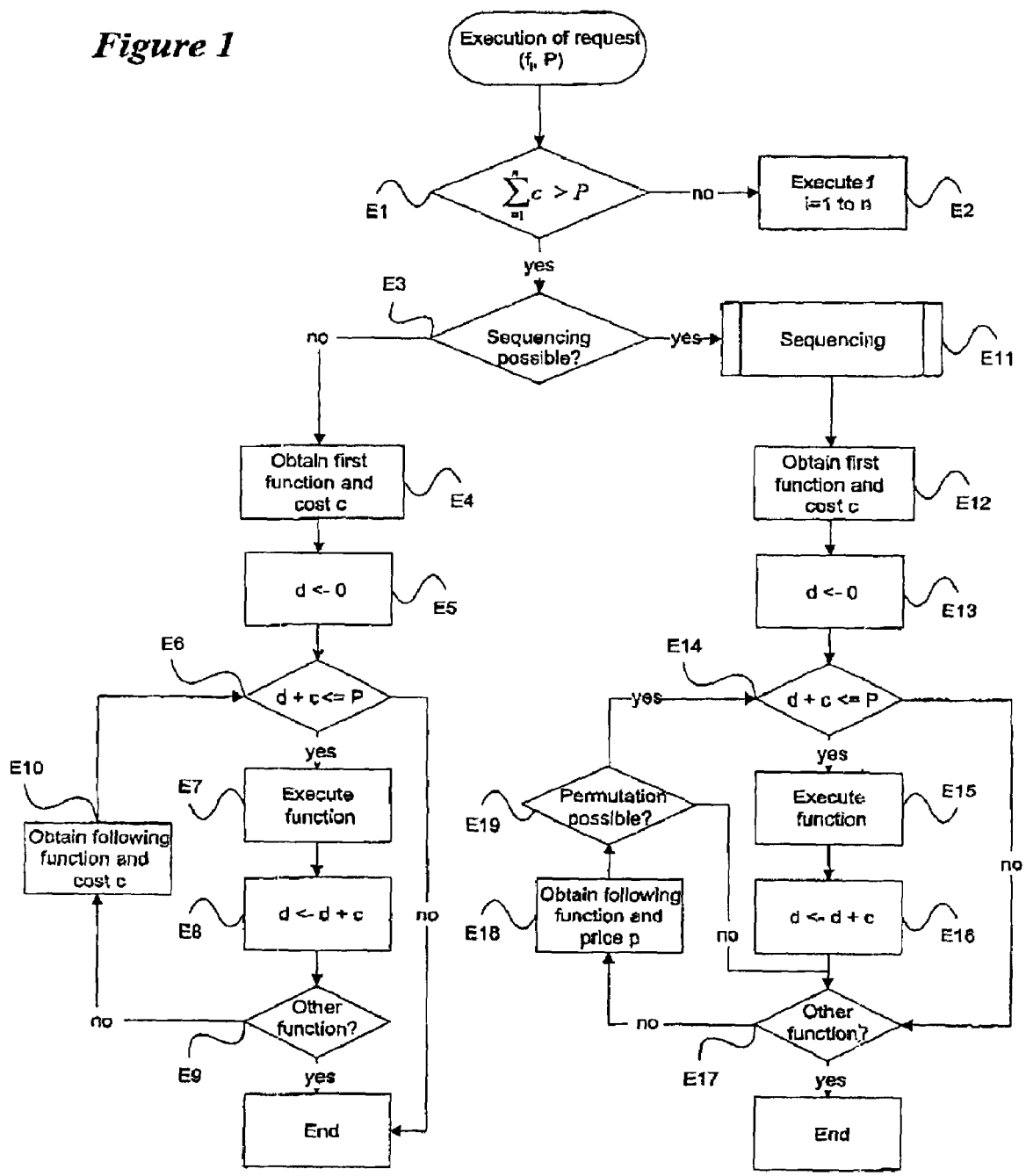
FIG. 1 is an algorithm illustrating a function execution method according to one embodiment of the invention.

A function execution method implemented in a communication network will be described first of all with reference to FIG. 1.

Hereinafter, a client station U connected to a server station H is considered. Naturally, in a communication network, the different computers in the network can in turn be client station U or server station H.

In this example, the client station U can use the services of the server station H. In particular, the client station U can request the execution of a function directly on the server station H.

For example, and in no way limitatively, the server station can lodge digital images, and a user can, through the client station U, perform operations on one of the images on the server station H.

The operations can be the conversion of an image into black and white, the rotation of the image or a symmetry with respect to a horizontal or vertical axis of the image or an enlargement of the image.

When such an operation is executed at a distance, the image will be stored continuously on the server station H and will not pass over the communication network. The client station will be content with issuing a request for remote execution of the operation intended for the server station.

On the Internet it is possible to use a communication language such as XML ("extended Markup Language").

The use of this communication language for representing data objects on the network and accessing their functions is described in detail in European patent application 00 401 754.7 filed by Canon Research Centre France S.A.

A description of the different data fields which it is necessary to translate into the communication language of the network to make it possible to invoke functions on objects o at a distance is given below.

Field: interfaces

This field makes it possible to send several interfaces to distant applications.

```
<interfaces>
    <interface>...</interface>
    ...
</interfaces>
```

This field corresponds to the generic concept of a class of object, as defined in the JAVA or C++ languages.

An interface describes the operations or functions which are supported by a data object o.

These functions generally use parameters and possibly supply a result.

An interface also describes the data field or attributes which all the objects supporting this interface contain when they are translated into the communication language.

An interface can also contain a reference to other interfaces, whether they extend to these other interfaces or only supply a shorthand for using these other interfaces. The object then supports all these other interfaces referenced.

Field: attribute

This field contains the list of the attributes which an object supporting the interface contains when it is translated into the communication language.

Field: functions

This field contains the list of functions associated with the data object supporting this interface.

```
<functions>
    <function>...</function>
    ...
</functions>
```

This field corresponds to the generic concept of function. A function is identified by its signature, for example a name, the type of parameter used and the type of object obtained when this function is executed.

Field: arguments

This field contains the list of input arguments which; a function requires for its implementation.

```
<arguments>
    <arg>...</arg>
    ...
</arguments>
```

This field corresponds to an input argument of a function and can for example be a literal object or a complex object.

The function field thus makes it possible to invoke a function on a distant object. It is necessary to specify the target object o and the input arguments of the function as described above.

A distributed object-oriented system will be considered in the remainder of the description. A data object is an element comprising data, also referred to as attributes, and functions (or methods) possibly using input arguments. In such a system, the functions can be called or invokes in order to manipulate the data of the object.

The set of functions applicable to an object and attributes constitutes its interface.

In practice, the client station U sends an execution request to the server station H in order to invoke one or more functions on a data object lodged by the server station.

Here the concern is with the particular case where the execution request comprises several functions to be executed on one or more objects of the server.

Let for example the functions be $f_i$, with i between 1 and n.

Each function is associated with an execution cost, respectively $c_i$.

To execute the request, the server will have to be remunerated sufficiently to cover the sum of the execution costs $c_i$, i between 1 and n.

Prior to the execution of the request, it is then necessary to know the execution cost associated with each function $f_i$ and the cumulated sum of these costs $c_i$.

The execution cost is not generally known in advance to the client station and may be fixed freely by the server station, notably according to the object or data to which the function applies.

This information can be sent by the server station to the client station on request from the latter. The interface of the object to be manipulated is then sent to the client station and the cost of the function or functions to be executed is extracted from this interface.

An example of an interface enabling an image to be manipulated remotely is given below.

This interface has three functions:

"ConvertToB&W", the price of which is constant. This function makes it possible to convert an image into black and white;

"Rotate", the price of which depends on the size of the image and the rotation angle. The price is expressed in the form of an expression which the client station can evaluate: this function makes it possible to change the orientation of an image;

"Flip", whose price depends on parameters determined by the server station. The client is not capable of making the price calculation himself. The price is for example available at the following computer address:

```
http://oceania/web-obj/class/Image.xml#flip#price
This function makes it possible to apply a symmetry to the image.
<interface
    name="Image"
    href=http://oceania/web-obj/class/Image.xml />
    <attributes>
        <int name="width" price="0.01 FF" />
        <int name="height" price="0.01 FF" />
        <string name="encoding" />
    </attributes>
    <functions>
        <function name="convertToB&W" price="0.5 FF">
        </function>
        <function name="rotate">
            <arguments>
                <int name="angle" />
            </arguments>
            <price>
                <currency name="FF" />
                <value language="JavaScript">
                    function price (width, height, angle) {
                        return width*height*angle;
                    }
                </value>
            </price>
        </function>
        <function name="flip">
            <price>
                <currency name="FF" />
                <value />
            </price>
        </function>
    </functions>
</interface>
```

After reception of the interface by the client station, the interface can be stored for subsequent use in the cache memory of the client station.

The execution cost $c_i$ associated with each function $f_i$ is then determined either by reading the cost stored in the interface (for example for converting an image into black and white), or by calculating an expression (for example for the rotation function "rotate"), or by requesting this cost from the server station (for the symmetry function "flip" for example).

Thus certain functions which are relatively quick and easy to execute (for example the conversion into black and white of an image 16 pixels square) will be less expensive than an appreciably longer and more complex operation (for example the rotation of an image 2048 pixels square through 35°). Conversion into black and white will for example be invoiced at 1 centime by the server station H, whilst the rotation will be invoiced at 1 franc.

When the station wishes to have a set of functions executed on the server station, the global cost can thus be calculated by estimating the sum of the costs associated with each function.

In this example embodiment, it is also considered that the remote execution of the functions is paid for "on the fly" by the client station U, that is to say a sum of money P is sent by the client station to the server station.

This sum of money P thus corresponds to the predetermined amount available for paying the server when the requested functions are executed.

Preferably, this predetermined amount P is directly included in the function execution request sent by the client station to the server station.

Use is made by way of example, in order to generate this electronic money, of a system known as PayWord proposed by Rivest and Shamir.

A description of this system can be found in "PayWord and MicroMint: Two simple micropayment schemes", by Ronald L. Rivest and Adi Shamir, MIT Laboratory for computer science, May 7, 1996.

Naturally the predetermined amount P making it possible to remunerate the server station for executing all the functions $f_i$ could also be stored directly in an account associated with the client and accessible to the server station.

Whatever the case, when the request for executing the set of functions $f_i$ is received by the server station H, a comparison step E1 is implemented first, as illustrated in FIG. 1, in order to compare the sum of the execution costs $c_i$ associated with the functions with the predetermined amount P corresponding to the sum of money available for executing the functions.

If the sum of the costs is not greater than the predetermined amount P, an execution step E2 can be implemented in a conventional manner so that the functions are executed in the order in which they were entered in the request by the client station U.

Otherwise, if the sum of the execution costs is strictly greater than the predetermined amount P, a test E3 checks whether the set of functions $f_i$ to be executed can be resequenced.

It is a case in practice of determining whether the functions can be permuted without the result produced on the object to which they apply being modified.

In the negative, the function execution method continues without modifying the order of the functions of the request.

In an obtaining step E4, the first function stored in the request is considered, together with its associated cost c.

An initialization step E5 makes it possible to initialize, to the value zero, the cumulated sum d corresponding to the cumulated sum of the costs of each function of the previously executed request.

A comparison step E6 is then implemented in order to compare the predetermined amount P with the cumulated sum of the execution cost c of the function processed and the sum d of the execution costs associated with the previously executed functions.

If the cumulated sum d+c is less than or equal to the predetermined amount P, an execution step E7 is implemented so as to execute the function.

A step E8 of updating the cumulated sum d is then implemented, in which the value d is incremented by the execution cost c associated with the function which has just been executed.

In a test step E9 it is checked whether there exist other functions to be executed in the request received by the server station H.

In the affirmative, a reading step E10 makes it possible to obtain the following function and its associated execution cost.

The steps of comparison E6, execution E7, updating E8 and testing E9 are then reiterated on this current function.

If at the end of the test step E9 all the functions have been executed, the execution process is terminated. It should be noted however that such a case should not occur as soon as at the end of the comparison step E1, the sum of the execution costs has been found to be greater than the predetermined amount P.

If, at the end of the comparison step E6, the cumulated sum d+c is strictly greater than the predetermined amount P, the execution method is also interrupted.

Returning to test step E3, if the resequencing of the functions included in the request is possible, at least partly, a resequencing step E11 is implemented in accordance with the sequencing method of the invention.

Figure 2:
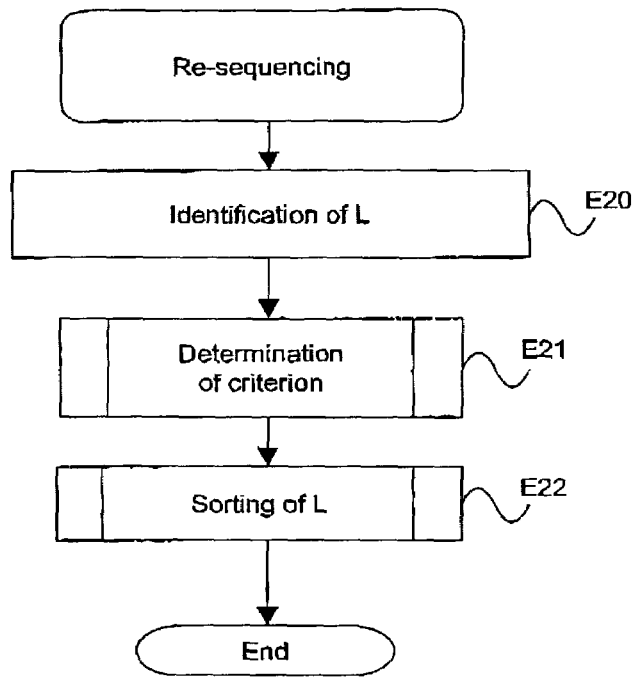
FIG. 2 is an algorithm illustrating a sequencing method according to one embodiment of the invention.

The sequencing method will be described with reference to FIGS. 2 to 4.

This sequencing method includes first of all a step E20 of identifying the set L of functions $f_i$ to be executed and the execution costs $c_i$ associated respectively with these functions.

A determination step E21 is then implemented in order to determine a sorting criterion chosen from amongst a set of criteria dependent on the execution cost of the functions.

Figure 3:
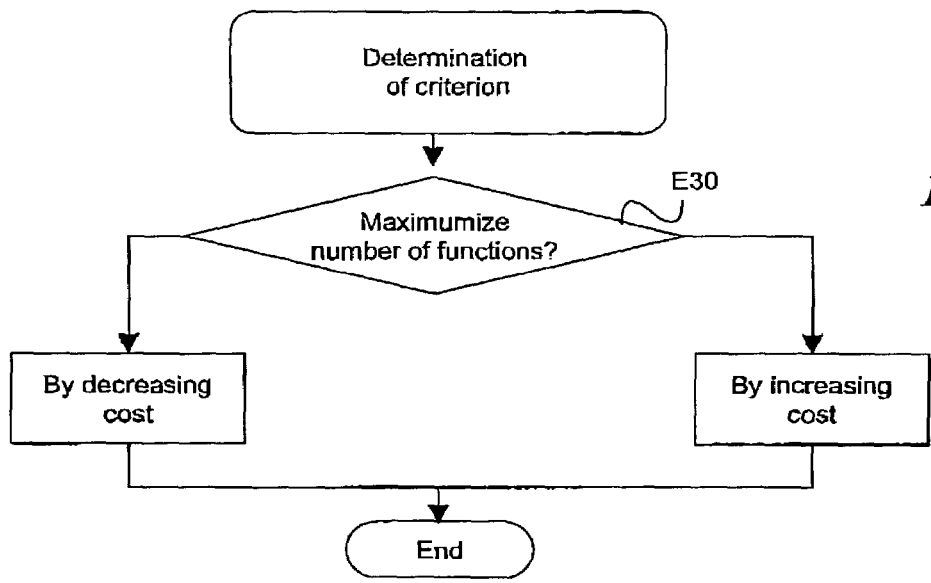
FIG. 3 is an algorithm detailing the step of determining a sorting criterion of FIG. 2.

This determination step is illustrated in detail, according to one embodiment of the invention, in FIG. 3.

Here a test E30 makes it possible to determine whether a maximum number of functions of the request are to be executed.

This test step E30 can be implemented by means of a request transferred from the server station H to the client station U and to which the client station can respond by yes or no.

In the affirmative, the retained criterion will correspond to a sorting by increasing cost of execution. It will then be possible, when the functions are processed in the increasing order of cost, to execute the maximum number of functions for a predetermined amount P.

Otherwise the retained criterion will correspond to a sorting by decreasing cost. This sorting criterion has the advantage of executing as a priority the most expensive functions corresponding a priori to important transformations of the object useful for the client station.

Naturally this criterion determination step can be implemented differently. For example, the sorting criterion can be imposed by the server, the determination of the criterion being effected by a simple reading of this criterion in a memory of the server station.

This criterion could also be introduced into a field of the request sent by the user for executing the functions should the available payment not be sufficient.

In addition, other sorting criteria depending on the execution cost could be used. In particular, the sorting criterion could couple both an order of priority associated with each function and their execution cost.

The order of priority associated with each function could be either given by the user of the communication network or determined by the server according to the importance accorded to each function.

The sorting to be carried out according to such a criterion could for example be effected by taking account first of all of the execution cost associated with each function, and then the order of priority associated with each function in order to sort the functions with the same execution cost.

Alternatively, the sorting could take into account first of all the order of priority associated with each function, and then the cost of execution for sorting the functions with the same order of priority.

Once this criterion has been determined, a sorting step E22 is implemented on the set of functions.

When all the functions can be permuted with each other, a simple sorting using the value of each execution cost is possible.

On the other hand, it may turn out that only certain functions can be permuted with each other or can be permuted only when they apply to different objects in the server station. In this case, a method of sorting by permutation can be used, such as the bubble sort method.

Preferably, for each function which can be executed on the server, a permutation table is stored, making it possible to store the possibility or not of permuting the functions with each other in pairs.

Such a permutation table can take the following form, for the functions described above "ConvertToB&W", "Rotate" and "Flip":

|  | ConvertToB&W | Rotate | Flip |
| --- | --- | --- | --- |
| ConvertToB&W | yes | yes | yes |
| Rotate | yes | yes | no |
| Flip | yes | no | yes |

Figure 4:
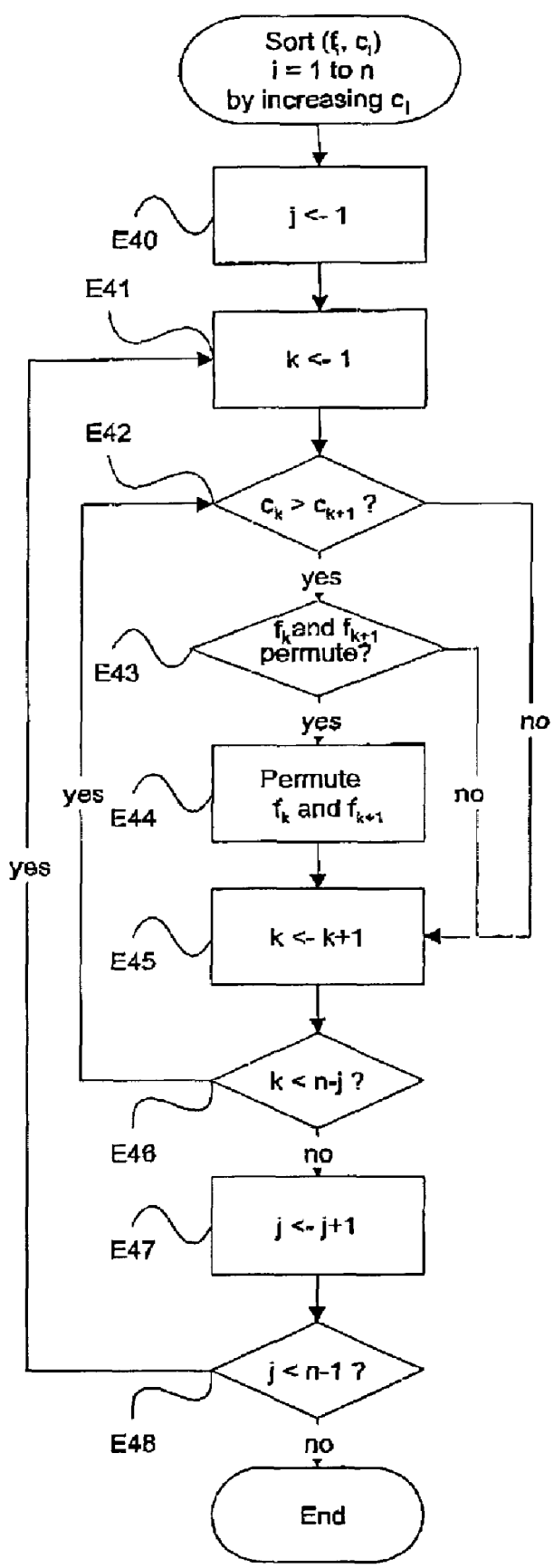
FIG. 4 is an algorithm detailing the sorting step of FIG. 2.
Figure 5:
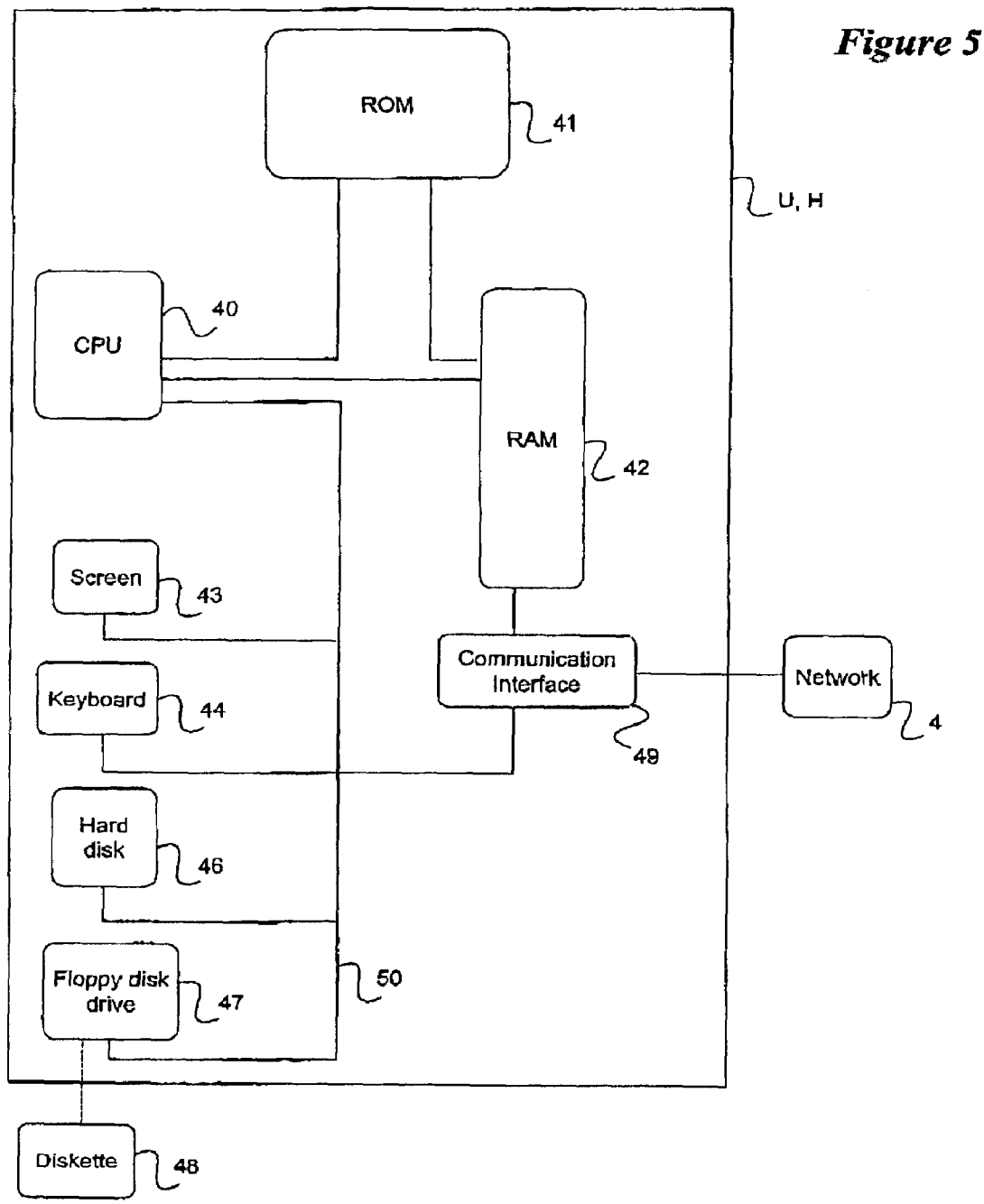
FIG. 5 is a block diagram of a device adapted to implement the sequencing and/or execution methods according to the invention.

An example of sorting making it possible to take into account the possible permutation of the functions is illustrated in FIG. 4.

It is here considered by way of non-limitative example that the sorting is effected on a set of functions $f_i$, i=1 to n, by increasing execution cost $c_i$.

An initialization step E40 makes it possible to initialize a first index j to the value 1, and a second initialization step E41 makes it possible to initialize a second index k to the value 1.

These two indices j, k make it possible to run through all the functions to be sorted and to permute these in pairs at each step.

A test step E42 makes it possible to check whether the cost $c_k$ associated with the current function is greater than the cost $c_{k+1}$ associated with the following function.

In the affirmative, a test step E43 makes it possible to check, from the permutation table as illustrated above, whether the functions in question $f_k$ and $f_{k+1}$ may permute. In the affirmative, a permutation step proper E44 is carried out in order to permute the functions $f_k$ and $f_{k+1}$ in the list L of functions to be sorted.

An update step E45 then makes it possible to increment the second index k by one unit, and then, in a test step E46, it is checked whether this second index k is strictly less than the value n−j, where n is the number of functions to be sorted and j the first index corresponding to the number of times the list L of functions to be sorted is run through.

As long as the second index k remains less than the value n−j, steps E42 to E46 are reiterated for all the functions $f_k$ in the list L of functions to be sorted, considered in pairs.

If at the end of the test step E42 the cost of the current function $c_k$ is less than or equal to the cost of the following function $c_{k+1}$, the index k is incremented by one unit directly in an update step E45. Likewise, if the current functions $f_k$ and $f_{k+1}$ cannot permute, for example when it is the function "Flip" and the function "Rotate", the step E45 of updating the index k is also implemented.

When at the end of the test step E46 the index k is greater than or equal to the value n−j, the value of the first index j is incremented by one unit in an update step E47 and this index j is compared with the value n−1. If this index j is less than the value n−1, all of steps E41 to E48 are reiterated.

Otherwise the sorting algorithm is terminated.

This algorithm thus makes it possible to compare two adjacent elements and to exchange them if they are not in order. At each sorting phase, corresponding to the implementation of steps E41 to E48, a partitioning is carried out between the function with the greatest execution cost and all the other functions.

Next, each sorting phase is implemented successively on these other functions.

A set of functions $f_i$ sequenced in a chosen order is thus obtained at the end of this sequencing step E11.

The execution method as illustrated in FIG. 1 then continues by processing the functions one by one in the chosen order.

In practice, the execution of the functions thus sequenced continues as long as the sum of the execution costs associated with the executed functions is less than or equal to the predetermined amount P corresponding to a sum of money available for the processing of the execution request.

As before, in an obtaining step E12, there is considered the first function stored in the order chosen and its associated cost c.

An initialization step E13 makes it possible to initialize, to the value zero, the cumulated sum d corresponding to the cumulated sum of the costs of each function of the previously executed request.

A comparison step E14 is next implemented in order to compare the predetermined amount P with the cumulated sum of the execution cost c of the function processed and the sum d of the execution costs associated with the previously executed functions.

If the cumulated sum d+c is less than or equal to the predetermined amount P, an execution step E15 is implemented so as to execute the current function.

A step E16 of updating the cumulated sum d is then implemented, in which the value d is incremented by the execution cost c associated with the function which has just been executed.

In a test step E17 it is checked whether there exist other functions to be executed in the list L of functions sorted in the chosen order.

In the affirmative, a reading step E18 makes it possible to obtain the following function and its associated execution cost.

Next the steps of comparison E14, execution E15, updating E16 and testing E17 are reiterated on this current function.

If at the end of the test step E17 all the functions have been executed, the execution method is terminated.

If at the end of the comparison step E14, the cumulated sum d+c is strictly greater than the predetermined amount P, the execution method continues in this embodiment with the processing of the following function in the chosen order.

This embodiment is particularly advantageous when the criterion chosen is a sorting by decreasing execution cost. This is because the steps E18 of obtaining the following function and its cost, of comparison E14 and possibly of execution if the cumulated sum d+c is less than or equal to the predetermined amount P are thus reiterated on a following function associated with a lower execution cost.

It is thus possible to increase the number of functions executed for a predetermined amount P.

This reiteration of the execution step on the following function in the chosen order can also be applied in the case where a partial sorting has been made by increasing cost (for example if only certain functions can be permuted with each other so that a total sorting cannot be carried out).

Where only certain functions can be permuted with others, before reiterating the comparison steps E14 et seq on a function following a non-executable function, it is necessary to first check, in a test step E19, whether or not the function in question can be permuted with the preceding non-executed functions.

In the negative, the execution method is interrupted. Otherwise the processing of the function considered at the obtaining step E18 can validly be effected.

By virtue of the sequencing method of the invention, it is thus possible to optimize the processing of the multiple functions in an execution request received by the server station.

These sequencing and execution methods can be implemented advantageously in a server station in a communication network.

In another embodiment, the sequencing method could possibly be implemented in the client station.

A device adapted to implement these sequencing and execution methods is illustrated in FIG. 4.

The sequencing device has means of identifying the functions included in the request as well as means for identifying (by reading or calculation) the costs associated with the functions. It also has means of determining a sorting criterion from a memory adapted to store the sorting criteria.

Sorting means are also provided for allowing the sorting proper of the functions, in association possibly with a table storing the possible permutations between the functions.

Means of executing each function are also incorporated in the execution device, in cooperation with a predetermined amount stored on the server station and possibly with the table of possible permutations between functions.

All these means can be incorporated both in the client station U and at the server station H in a computer as depicted in FIG. 4.

This computer comprises, in a conventional manner, a microprocessor 40, a read only memory 41 (ROM) storing either the method of remote execution of an operation or the method of executing this operation, and a random access memory 42 (RAM) containing different registers for implementing these methods.

The computer has notably a communication interface 49 able to be connected to a communication network 4 in order to receive or transfer requests or information.

In addition, the computer has document storage means, such as a hard disk 46, or is adapted to cooperate, by means of a disk drive 47, with removable storage means 48 such as diskettes, compact disks or computer cards (PC Cards).

These fixed or removable storage means can contain the code of the remote sequencing and execution method according to the invention which, once read by the microprocessor 40, will be stored on the hard disk 46.

By way of variant, the program enabling the device to implement the invention can be stored in the read only memory 41.

As a second variant, the program can be received in order to be stored as described previously by means of the communication network 4.

In a conventional manner, the computer also has a screen 43 for serving for example as an interface with an operator by means of a keyboard 44 or a mouse or any other means.

The central unit 40 (CPU) will execute instructions relating to the implementation of the invention.

On powering up, the programs and methods relating to the invention, stored in a non-volatile memory, for example the read only memory 41, are transferred into the random access memory 42, which will then contain the executable code of the invention as well as the variables necessary for implementing the invention.

Thus the random access memory 42 incorporated in a client station or a server station in a communication network will comprise registers for storing notably sorting criteria, a table of possible permutations and the costs associated with each function.

Likewise, the random access memory 42 incorporated in a server station in a communication network will comprise registers for storing the predetermined amount P, the list of functions sorted in a chosen order and the costs c associated with each function and the cumulated sum d.

A communication bus 50 affords communication between the different sub-elements of the computer or connected to it.

The representation of the bus is not limitative and notably the microprocessor is liable to communicate instructions to any sub-element directly or by means of another sub-element.

Naturally, many modifications can be made to the example embodiment described above without departing from the scope of the invention.

In particular, the PayWord system is only one example amongst others of electronic money which can be generated on the client station U and then spent on the server station H in a communication network.

In addition, the enhanced XML language used here can be replaced by other known systems such as CORBA, DCOM or JAVA/RMI.

Finally, the method of remotely executing functions as described here can be applied to computer systems other than a distributed object-oriented system.

The invention claimed is:

1. A computer implemented method, implemented in a computer device, of executing a function execution request, comprising the steps of:
   receiving the function execution request which is sent by a user of a user terminal, the function execution request including a set of functions to be executed and a sorting criterion for sorting the set of functions;
   identifying, from the function execution request received from the user terminal, said set of functions included in the received function execution request to be executed on the computer device;
   reading the sorting criterion included in the received function execution request sent by the user of the user terminal;
   sorting the identified set of functions included in the function execution request sent by the user of the user terminal using the read sorting criterion included in the function execution request; and
   executing the identified set of functions sorted in the sorting step based on a sorted order obtained in the sorting step,
   wherein, if only a sub-set of functions of the set of functions are permuted with each other or if some functions of the set of functions are permuted with each other only when they apply to different objects in a server station, the sorting step applies a method of sorting by permutation.

2. The method according to claim 1, wherein, at the step of reading the sorting criterion, the criterion belongs to a set of criteria comprising at least a sorting by increasing execution cost and a sorting by decreasing execution cost.

3. The method according to claim 1, wherein, at the step of reading the sorting criterion, the sorting criterion is an order of priority associated with each function of the set of functions included in the function execution request.

4. The method according to claim 1, wherein, at the step of identifying said set of functions, execution costs associated respectively with each of said functions are identified.

5. The method according to claim 1, wherein said server stores a permutation table containing information on the possibility or not of permuting the function with each other in pairs.

6. The method according to claim 5, wherein the step of sorting by permutation makes use of the sorting criterion and of the permutation table.

7. A computer implemented method of executing functions on a server station in a communication network, wherein, when only a part of said functions can be executed by the server station, the method comprises the steps of:
   receiving a unique function execution request which is sent by a user of a user terminal, the function execution request including said functions to be executed by the server station and a sorting criterion for sorting the functions;
   identifying, from the unique function execution request received from the user terminal, said functions included in the received unique function execution request sent by the user of the user terminal;
   reading the sorting criterion included in the received unique function execution request sent by the user of the user terminal;
   sorting the identified functions included in the unique function execution request sent by the user of the user terminal using the read sorting criterion included in the received unique function execution request; and
   executing the identified functions in the order sorted by the sorting step as long as the server can execute said functions,
   wherein, if only a sub-set of functions of the set of functions are permuted with each other or if some functions of the set of functions are permuted with each other only when they apply to different objects in a server station, the sorting step applies a method of sorting by permutation.

8. The method according to claim 7, wherein the execution step includes the following substeps for each current function:
   obtaining an execution cost associated with the current function;
   calculating an accumulated sum of the execution cost obtained and a sum of the execution costs associated with functions previously executed;
   comparing a predetermined amount and said accumulated sum; and
   executing said current function if the accumulated sum is less than or equal to said predetermined amount.

9. The method according to claim 8, wherein, the sorting criterion is a sorting by decreasing execution cost, and at the end of the comparison step, the execution step is reiterated for the function following said current function in the sorted order if the accumulated sum is strictly greater than the predetermined amount.

10. The method according to claim 9, further comprising, prior to the execution step, a test step of checking whether the function can be permuted with preceding non-executed functions.

11. A device for executing a function execution request, comprising:
receiving means that receives the function execution request which is sent by a user of a user terminal, the function execution request including a set of functions to be executed and a sorting criterion for sorting the set of functions;
identifying means for identifying, from the function execution request received from the user terminal, said set of functions included in the received function execution request;
reading means for reading the sorting criterion included in the received function execution request sent by the user of the user terminal;
sorting means for sorting the identified set of functions included in the received function execution request sent by the user of the user terminal using the read sorting criterion included in the function execution request; and
executing means for executing the set of functions sorted by the sorting means based on a sorted order obtained by the sorting means,
wherein, if only a sub-set of functions of the set of functions are permuted with each other or if some functions of the set of functions are permuted with each other only when they apply to different objects in a server station, the sorting means applies a method of sorting by permutation.

12. The device according to claim 11, wherein the sorting criterion belongs to a set of criteria comprising at least a sorting by increasing execution cost and a sorting by decreasing execution cost.

13. A device for executing functions on a server station in a communication network, comprising:
receiving means that receives a unique function execution request which is sent by a user of a user terminal, the unique function execution request including said functions to be executed by the server station and a sorting criterion for sorting the functions;
identifying means for identifying, from the unique function execution request received from the user terminal, said functions included in the received function execution request;
reading means for reading the sorting criterion included in the received unique function execution request sent by the user of the user terminal;
sorting means for sorting the identified functions included in the unique function execution request sent by the user of the user terminal using the read sorting criterion included in the unique function execution request; and
execution means that executes the identified functions in the sorted order sorted by the sorting means as long as the server can execute said functions,
wherein, if only a sub-set of functions of the set of functions are permuted with each other or if some functions of the set of functions are permuted with each other only when they apply to different objects in a server station, the sorting means applies a method of sorting by permutation.

14. The device according to claim 13, wherein the execution means comprises:
obtaining means for obtaining an execution cost associated with a current function;
calculating means for calculated an accumulated sum of the execution cost obtained and a sum of the execution cost associated with functions previously executed;
comparing means for comparing a predetermined amount and the accumulated sum; and
execution means that executes said current function if the accumulated sum is less than or equal to said predetermined amount.

15. The device according to claim 13, further comprising test means that checks whether a current function can be permuted with preceding non-executed functions in the chosen order.

16. A computer implemented method, implemented in a computer device, of executing a function execution request, comprising the steps of:
receiving a function execution request, the function execution request including a set of functions to be executed by the server station and a sorting criterion for sorting the functions to be executed;
identifying, from the received function request, the set of functions included in the received unique function execution request;
reading the sorting criterion included in the received function execution request;
checking whether at least a sub-set of functions of the sub-set of functions are permuted without the result produced on the objects to which they apply being modified;
in case of positive answer, sorting by permutation the identified set of functions included in the function execution request using the read sorting criterion included in the function execution request, if only a sub-set of functions of the set of functions can be permuted with each other or if some functions of the set of functions can be permuted with each other only when they apply to different objects in a server station; and
executing the identified set of functions sorted in the sorting step based on a sorted order obtained in the sorting step.

* * * * *